US008503406B2

(12) United States Patent
Oota

(10) Patent No.: US 8,503,406 B2
(45) Date of Patent: Aug. 6, 2013

(54) RADIO COMMUNICATION EQUIPMENT

(75) Inventor: Yoshiyuki Oota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 488 days.

(21) Appl. No.: 12/491,582

(22) Filed: Jun. 25, 2009

(65) Prior Publication Data
US 2010/0067499 A1 Mar. 18, 2010

(30) Foreign Application Priority Data
Sep. 18, 2008 (JP) ................................. 2008-238914

(51) Int. Cl.
H04J 3/00 (2006.01)
(52) U.S. Cl.
USPC ............................ 370/336; 370/348; 370/465
(58) Field of Classification Search
USPC ......... 370/328–330, 336–337, 345, 347–348, 370/436–437, 442–443
See application file for complete search history.

(56) References Cited

U.S. PATENT DOCUMENTS

| 5,999,818 | A  | * | 12/1999 | Gilbert et al. | 455/448 |
| 6,469,996 | B1 | * | 10/2002 | Dupuy | 370/337 |
| 6,597,681 | B1 | * | 7/2003 | Conner | 370/347 |
| 6,611,509 | B1 | * | 8/2003 | Hayashi et al. | 370/335 |
| 6,920,121 | B2 | * | 7/2005 | Tan | 370/329 |
| 6,973,065 | B2 | * | 12/2005 | Hayashi et al. | 370/335 |
| 7,167,482 | B1 | * | 1/2007 | Menzel et al. | 370/442 |
| 7,218,936 | B2 | * | 5/2007 | Rinne et al. | 455/447 |
| 7,310,531 | B2 | * | 12/2007 | Uchida | 455/450 |
| 7,486,639 | B2 | * | 2/2009 | Stanwood et al. | 370/329 |
| 7,522,924 | B2 | * | 4/2009 | Abeta et al. | 455/452.2 |
| 7,539,173 | B2 | * | 5/2009 | Ishiguro et al. | 370/348 |
| 7,848,344 | B2 | * | 12/2010 | Hulder et al. | 370/437 |
| RE43,107 | E  | * | 1/2012 | Dupuy | 370/337 |
| 2003/0117990 | A1 | * | 6/2003 | Menzel et al. | 370/345 |
| 2005/0180377 | A1 | * | 8/2005 | Muramoto et al. | 370/345 |
| 2006/0182142 | A1 | * | 8/2006 | Schmidt | 370/465 |
| 2007/0230428 | A1 |   | 10/2007 | Seki et al. | |
| 2007/0291702 | A1 | * | 12/2007 | Nanba et al. | 370/336 |
| 2008/0056205 | A1 | * | 3/2008 | Nagai | 370/336 |

FOREIGN PATENT DOCUMENTS

JP 2007-274042 10/2007
JP 2009-21787 A 1/2009

OTHER PUBLICATIONS

Japanese Office Action mailed Nov. 27, 2012 for corresponding Japanese Application No. 2008-238914, with Partial English-language Translation.

* cited by examiner

Primary Examiner — Kevin Mew
(74) Attorney, Agent, or Firm — Fujitsu Patent Center

(57) ABSTRACT

Radio communication equipment performs radio communication with a first radio terminal group in a first period by using a frequency commonly for use by an adjacent base station, and with a second radio terminal group in a second period by using a frequency not commonly for use by the adjacent base station. The radio communication equipment includes a control unit to adjust time allocation of the first period and the second period; and a radio communication unit to perform radio communication with the first radio terminal group and the second radio terminal group according to the time allocation adjusted by the control unit.

18 Claims, 11 Drawing Sheets

BS1 FRAME MAPPING

FIG. 9

MCS TABLE 111

| ITEM | CINR [dB] | MCS | NUMBER OF TRANSMISSION BITS PER SLOT |
|---|---|---|---|
| 01 | 5 > CINR | QPSK (1/2) | 96 |
| 02 | 5 ≤ CINR < 10 | QPSK (3/4) | 144 |
| 03 | 10 ≤ CINR < 15 | 16QAM (1/2) | 192 |
| 04 | 15 ≤ CINR < 20 | 16QAM (3/4) | 288 |
| 05 | 20 ≤ CINR < 25 | 64QAM (1/2) | 288 |
| 06 | 25 ≤ CINR < 30 | 64QAM (2/3) | 384 |
| 07 | 30 ≤ CINR < 35 | 64QAM (3/4) | 432 |
| 08 | 35 ≤ CINR < 40 | 64QAM (5/6) | 480 |

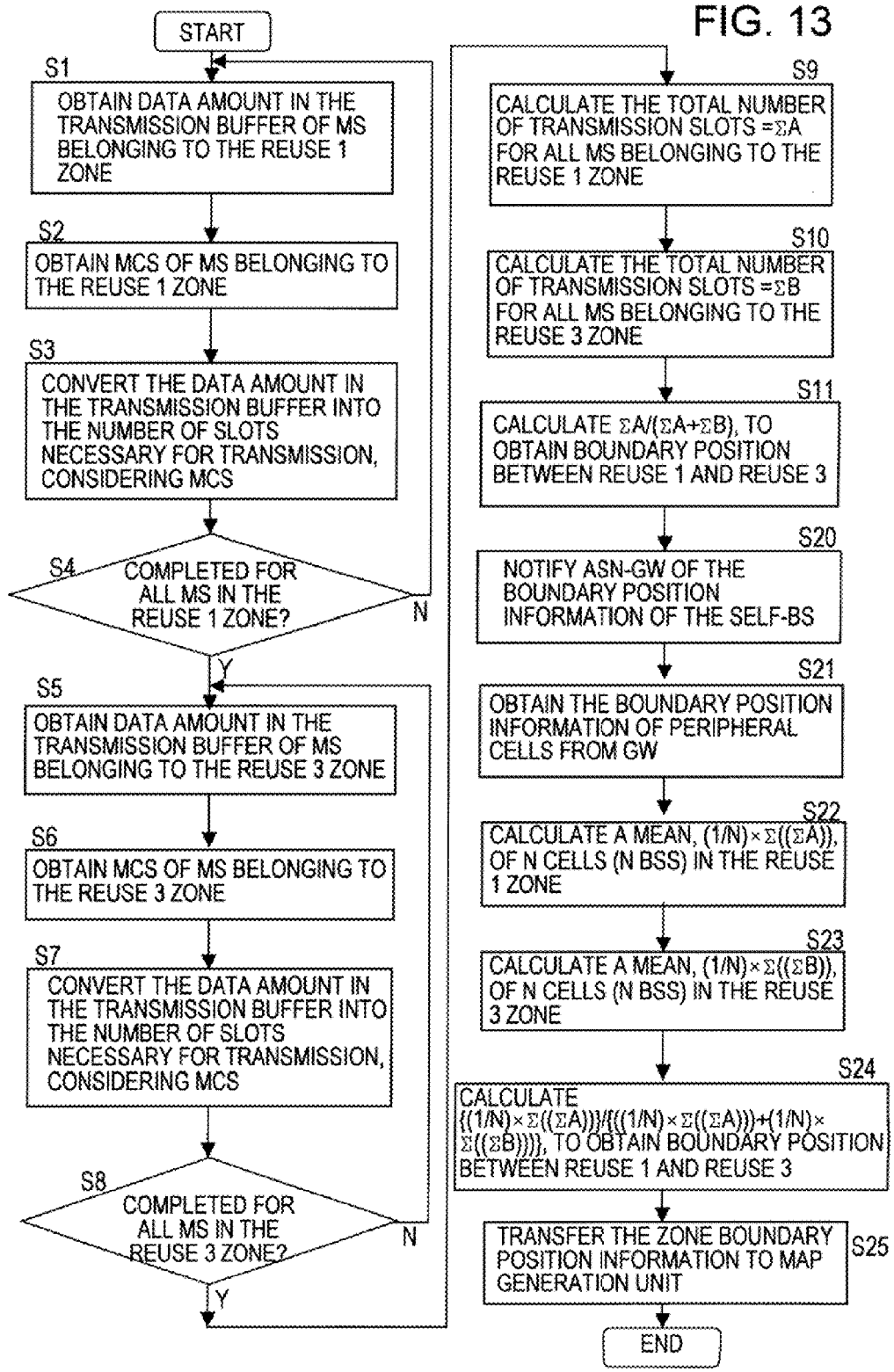

RADIO COMMUNICATION EQUIPMENT

CROSS-REFERENCE TO RELATED APPLICATIONS

This application is based upon and claims the benefit of priority of the prior Japanese Patent Application No. 2008-238914, filed on Sep. 18, 2008, the entire contents of which are incorporated herein by reference.

FIELD

A certain aspect of the embodiment discussed herein relates to radio communication equipment.

BACKGROUND

An example of a radio communication system will be explained in which a plurality of adjacent radio zones are formed by locating a plurality of base stations in respective radio zones.

FIG. 1 depicts a diagram illustrating an exemplary cell allocation of three base stations BS1 to BS3. In FIG. 1, a state of the zonal frequency allocation is illustrated when FFR (Fractional Frequency Reuse) in the frequency axis direction is applied to improve frequency use efficiency in particular.

FIG. 2 illustrates exemplary frequency allocation when FFR in the frequency axis direction is applied. In FIG. 2, for radio communication with terminals or mobile stations located in the vicinity of the center in a radio zone of each base station BS1-BS3, an identical frequency band A [such as depicted in (B) of FIG. 2] is used. Also, in the peripheral areas in the radio zone of the respective base stations, frequency bands B, C and D obtained by dividing the above frequency band A into three [such as depicted in (A) of FIG. 2] are used. As an example in FIG. 1, the base station BS1 uses the frequency band B.

Using such the frequency allocation, it is possible to mix the merit of frequency allocation producing optimal frequency use efficiency (which is referred to as reuse 1) with the merit of frequency allocation producing improved throughput by reducing interference (which is referred to as reuse 3).

Namely, since an identical frequency may be used in the vicinity of the center in the radio zone of the base station because of low interference, the frequency allocation by the reuse 1 is made. On the other hand, in the peripheral area in the radio zone of the base station, since the reuse 1 using an identical frequency produces large interference, causing reduction of throughput, different frequencies are used by the reuse 3. By this, it is possible to improve the throughput by applying the reuse 1 producing the highest frequency use efficiency, while interference may be reduced in the peripheral area.

In FIG. 3, an exemplary frame structure when FFR in the frequency axis direction is applied in the typical OFDM (Orthogonal Frequency Division Multiple Access) is illustrated. In the figure, the vertical axis indicates a subchannel direction and the horizontal axis indicates a symbol direction. The example in FIG. 3 depicts frame mapping in regard to the base station BS1. In the reuse 3 zone of the symbol direction (time axis direction), a ⅓-divided frequency band is allocated to each of the three base stations.

On the other hand, FIG. 4 illustrates a frequency allocation diagram in case that FFR is applied in the time axis direction. The zonal frequency allocation is the same as the allocation illustrated in FIG. 1. However, a common frequency band is applied to each base station BS1-BS3, as illustrated in FIG. 4.

FIG. 5 illustrates an exemplary OFDMA frame structure in the case that FFR in the time axis direction is applied in correspondence to FIG. 4. The period of an applied frequency in a frame is allocated by being time divided into ⅓, which is a different point from FFR in the frequency axis direction illustrated in the above FIG. 3.

As a related art, there is an invention disclosed in patent document 1, Japanese Laid-open Patent Publication No. 2007-274042. According to the above patent document 1, the transmission power of a base station is varied or the magnitude of reuse 1 and reuse 3 zones is varied on the basis of a data amount.

SUMMARY

According to the above description, when FFR is applied to the OFDMA system, conventionally, the boundary between the reuse 1 zone and the reuse 3 zone of a radio frame is fixed.

However, the inventors of the present invention have noticed that, if the boundary is determined fixedly, deterioration of throughput may occur in some situations. For example, when the data amount to be transmitted in the reuse 1 zone is greater than the data amount to be transmitted in the reuse 3 zone, an idle radio resource may possibly be produced in the reuse 3 zone, resulting in a waste thereof. Accordingly, in some cases, there may occur a problem that the number of bits necessary for transmission cannot be transmitted because of the occurrence of an overflowed transmission buffer.

Accordingly, it is an object of the present invention to efficiently use radio resources.

According to a first aspect of the invention, radio communication equipment performing radio communication with a first radio terminal group in a first period by a frequency commonly for use by an adjacent base station, and performing radio communication with a second radio terminal group in a second period by a frequency not commonly for use by the adjacent base station, the radio communication equipment including: a control unit adjusting time allocation of the first period and the second period; and a radio communication unit performing radio communication with the first radio terminal group and the second radio terminal group according to the time allocation adjusted by the control unit.

According to a second aspect of the invention, in radio communication equipment performing radio communication with a first radio terminal group in a first period by a frequency commonly for use by one or a plurality of adjacent base stations, and in among a plurality of partial periods included in a second period, suspending transmission in each partial period of exclusive transmission performed by the one or the plurality of adjacent base stations, whereas performing radio communication with a second radio terminal group in a second partial period of transmission suspension by the adjacent base stations, being included in the second period and different from the each partial period of exclusive transmission, the radio communication equipment includes a control unit for adjusting time allocation of the first period and the second period, and for applying a partial period in the adjusted second period as the second partial period, and a radio communication unit for performing radio communication with the first radio terminal group and the second radio terminal group according to the time allocation adjusted by the control unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is an enlarged explanation diagram of MCS table;

FIG. 13 illustrates an operating flow corresponding to the configuration illustrated in FIG. 12.

DESCRIPTION OF EMBODIMENTS

Embodiments will now be described according to the attached drawings.

In the embodiments, a base station (radio communication equipment) performs radio communication with a first radio terminal (or mobile station) group by a frequency commonly for use by an adjacent base station in a first period [for example, a period in which radio communication is performed using a reuse 1 (refer to A in FIG. 3)], and performs radio communication with a second radio terminal group by a frequency not commonly for use by the adjacent base station in a second period [for example, a period in which radio communication is performed using a reuse 3 (refer to B in FIG. 3)].

Further, the above base station includes a control unit, which adjusts time allocation of the first period and the second period, and a radio communication unit, which performs radio communication with the first radio terminal group and the second radio terminal group according to the time allocation adjusted by the above control unit.

By this, a boundary (time boundary) between the first period and the second period may be made variable, which may make it possible to effectively use radio resources.

Figure 5:
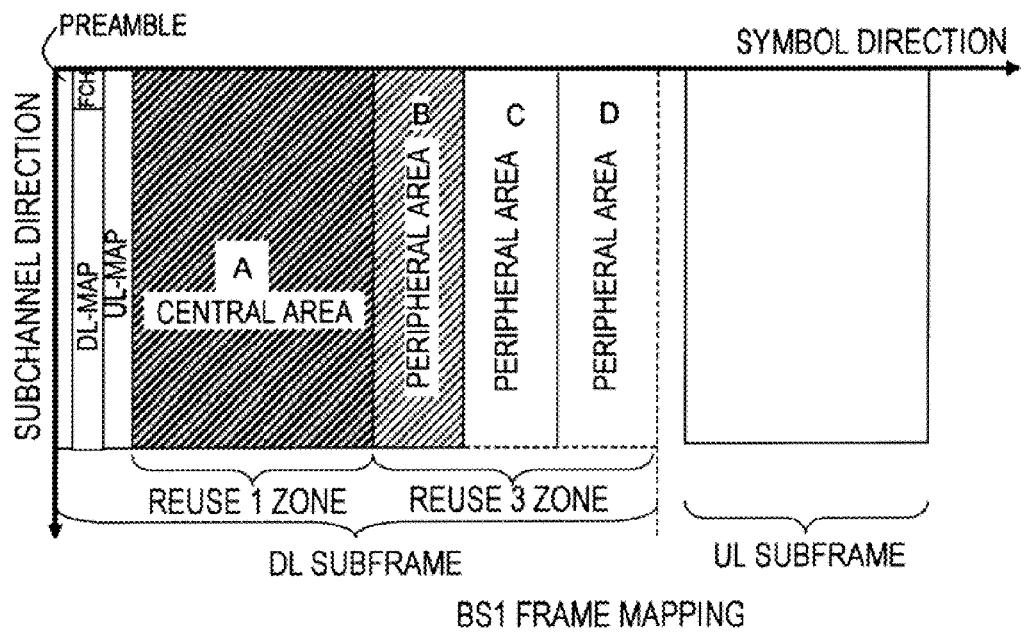
FIG. 5 illustrates an exemplary OFDMA frame structure in the case that FFR in the time axis direction is applied in correspondence to FIG. 4.

Further, it may also be possible that the base station (radio communication equipment) performs radio communication with the first radio terminal group by a frequency commonly for use by one or a plurality of adjacent base stations in a first period [for example, a period in which radio communication is performed using the reuse 1 (refer to A in FIG. 5)], while in among a plurality of partial periods included in a second period (for example, refer to periods B-D in which radio communication is performed using the reuse 3), the base station does not perform transmission in each partial period (for example, C and D illustrated in FIG. 5), in which one or a plurality of adjacent base stations exclusively perform transmission, and performs radio communication with the second radio terminal group in a second partial period (refer to B illustrated in FIG. 5) which is included in the second period and different from each the above partial period of exclusive transmission (for example, C and D illustrated in FIG. 5).

Further, the above base station is configured to have a control unit to adjust time allocation of the first period and the second period, and to apply a partial period in the adjusted second period as a second partial period, and a radio communication unit to perform radio communication with the first radio terminal group and the second radio terminal group according to the time allocation adjusted by above control unit.

By this, the boundary between the first period and the second period may be made variable, which may make it possible to effectively use the radio resources.

Figure 6:
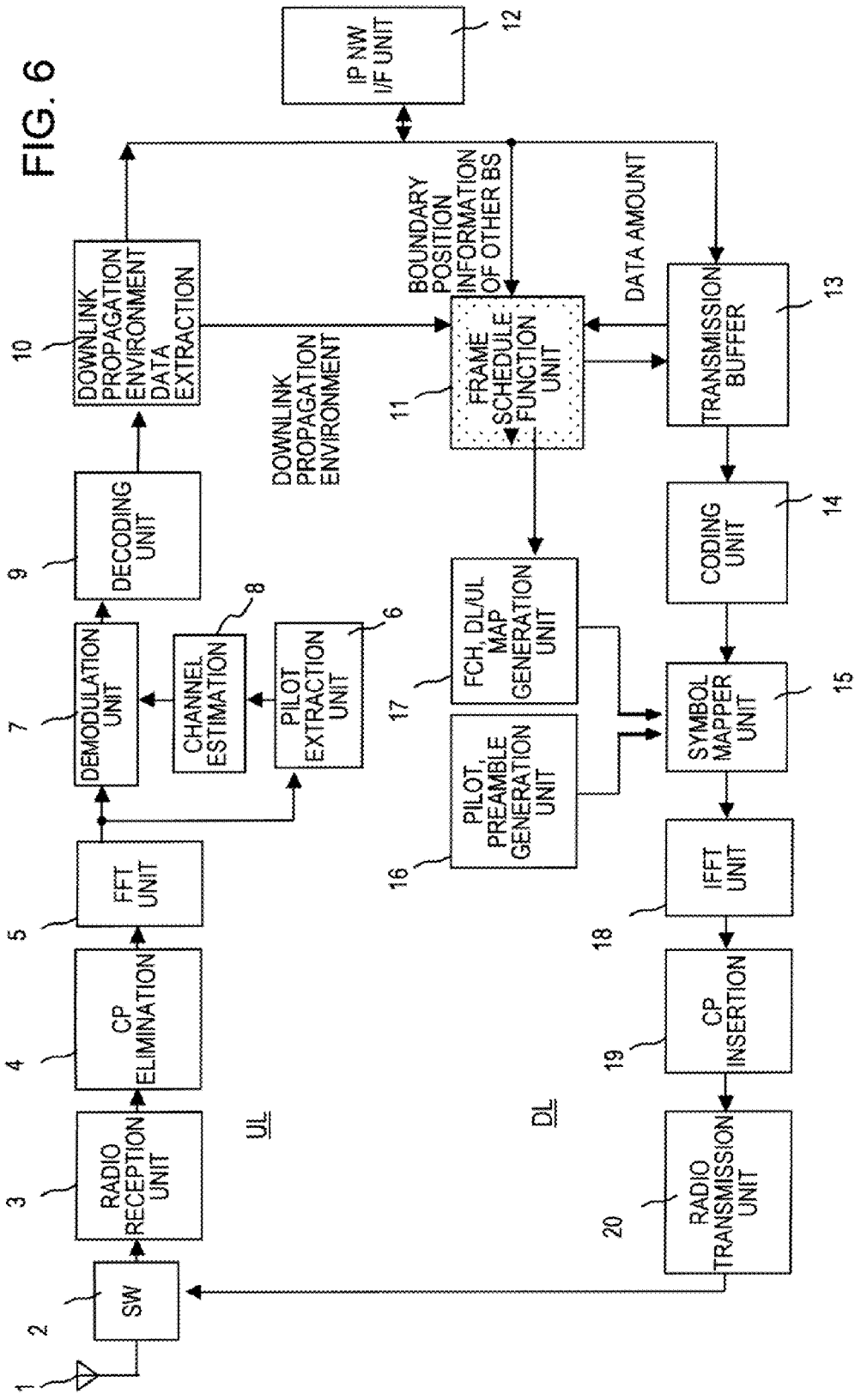
FIG. 6 illustrates a block diagram illustrating an exemplary configuration of base station equipment in which the present embodiment is applied.

FIG. 6 illustrates a block diagram depicting an exemplary configuration of base station equipment in which the present embodiment is applied.

The downlink DL side and the uplink UL side are switched through a duplexer switch 2, so as to be connected to a transmission/reception antenna 1.

An uplink signal received by transmission/reception antenna 1 is converted into an intermediate frequency signal by a radio reception unit 3. The intermediate frequency signal is input to a CP elimination unit 4, in which a cyclic prefix (CP) is eliminated.

Next, Fourier Transformation (FFT) is performed in an FFT unit 5 in correspondence to the IFFT on the transmission side, so that conversion into a signal on a time axis is made.

The output of FFT unit 5 is input to a pilot extraction unit 6 and a demodulation unit 7. A pilot signal is extracted in pilot extraction unit 6, and channel estimation is performed in a channel estimator unit 8 using the pilot signal as a criterion. Then, in a demodulation unit 7, demodulation corresponding to a modulation scheme used in the mobile station side is performed based on the above estimation, so that a baseband signal is obtained.

In a decoding unit 9, the baseband signal from demodulation unit 7 is decoded corresponding to the coding on the mobile station side.

A signal decoded by decoding unit 9 is forwarded to another base station through an IP network interface 12.

Further, in regard to the signal decoded in decoding unit 9, a data being included in the decoded signal and indicative of a downlink propagation environment is extracted in a downlink propagation environment data extraction unit 10, and forwarded to a frame schedule function unit 11.

Frame schedule function unit 11 reads out a transmission data to a downward direction from a transmission buffer 13, and controls to set a zone boundary position to a map generation unit 17 which performs frequency allocation to the frame format.

In regard to the functions of the above frame schedule function unit 11, a more detailed embodiment will be described later.

The downward transmission data read out from transmission buffer 13 is coded in a coding unit 14, and forwarded to a symbol mapper unit 15.

Symbol mapper unit 15 inputs a pilot signal and a preamble signal generated in a pilot signal and preamble signal generation unit 16, and further inputs a channel allocation signal, generated in map generation unit 17, for a data area in the frequency axis direction and the symbol direction.

According to the channel allocation signal from map generation unit 17, symbol mapper unit 15 assigns the pilot signal, the preamble signal and the downlink transmission data to the frame format, so as to output.

The output from symbol mapper unit 15 is inverse Fourier transformed in an IFFT unit 18, so as to be transformed into a frequency domain signal. To the signal being inverse Fourier transformed in IFFT unit 18, a cyclic prefix (CP) is inserted in a CP insertion unit 19, which is then converted into a radio frequency signal in a radio transmission unit 20 and radiated to transmission/reception common antenna 1 via duplexer switch 2.

Figure 7:
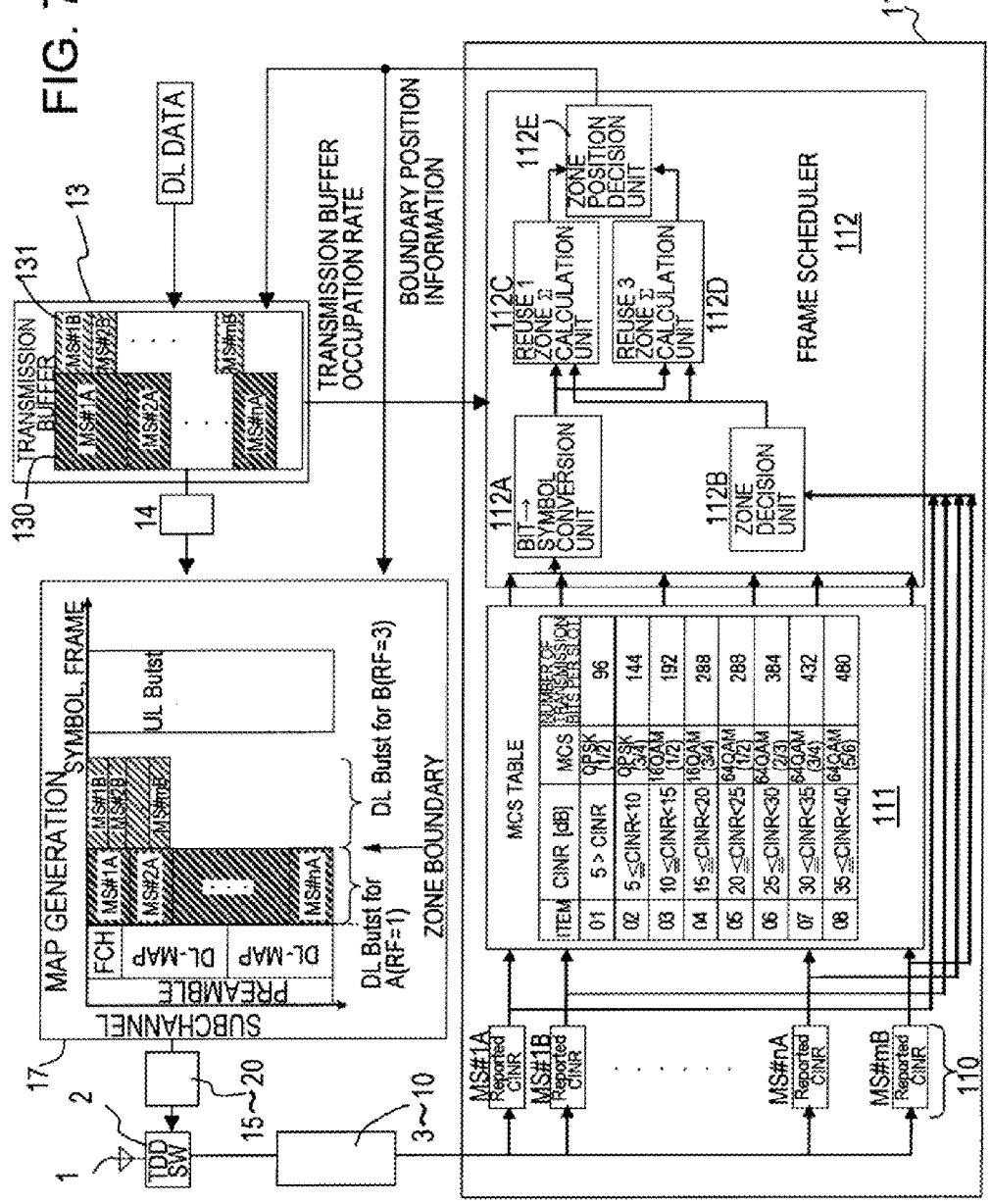
FIG. 7 is a diagram explaining a detailed configuration of a characteristic part of the embodiment, in which frame schedule function unit 11 illustrated in FIG. 6 is highlighted.

FIG. 7 is a diagram explaining a detailed configuration of a characteristic part of the embodiment, in which frame schedule function unit 11 illustrated in FIG. 6 is highlighted. Further, FIG. 8 illustrates an operating flow of the configuration illustrated in FIG. 7, which is executed on the basis of a transmission frame.

In FIG. 7, reception quality information in each mobile terminal in regard to prior frame transmission is fed back to each base station. In transmission buffer 13, based on the reception quality information fed back, after being distributed to make each mobile terminal belong to a reuse 1 zone 130 and a reuse 3 zone 131, each transmission data to be forward to the corresponding mobile terminal is buffered.

Figure 8:
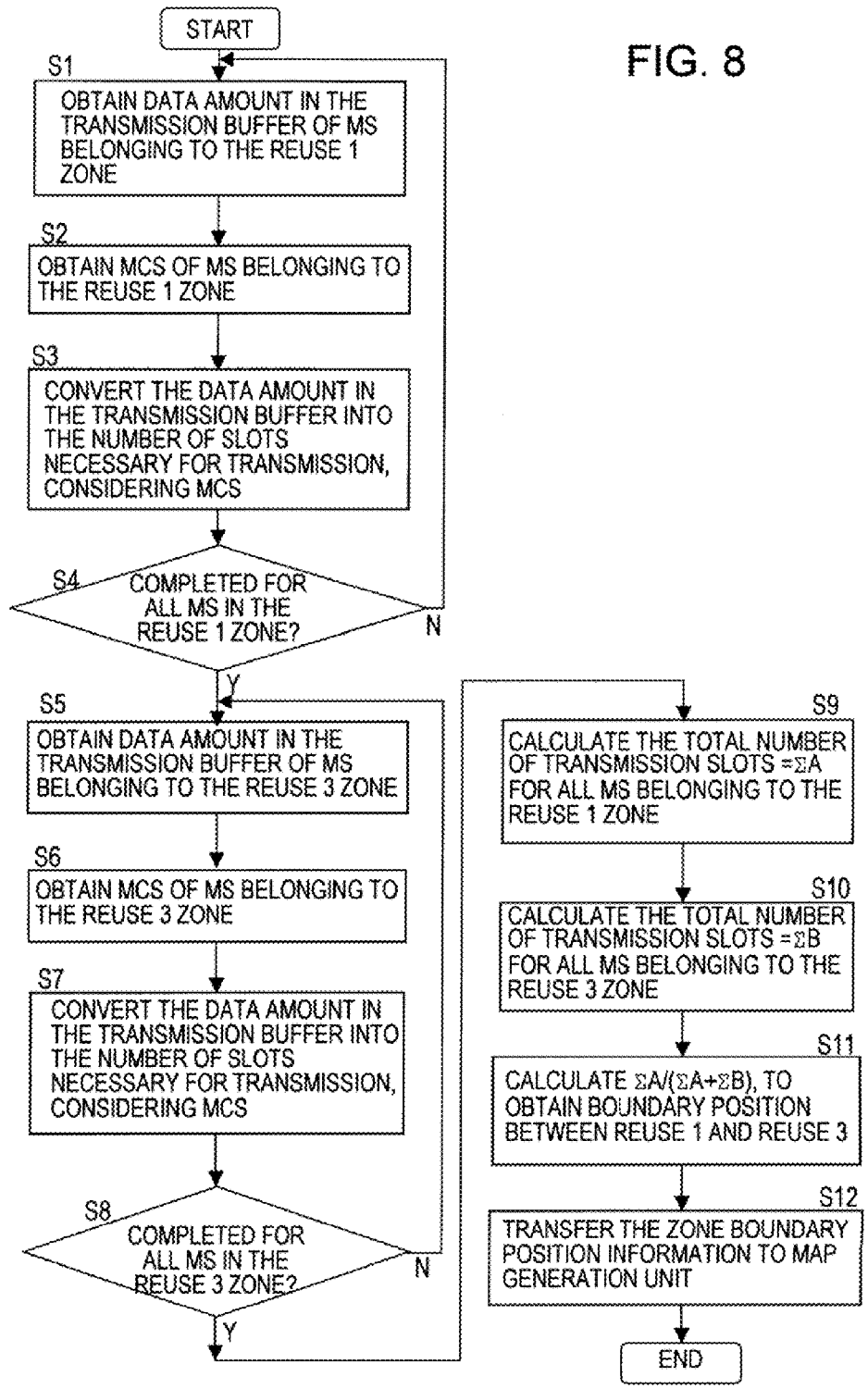
FIG. 8 illustrates an operating flow of the configuration illustrated in FIG. 7.

Accordingly, a frame scheduler 112 in frame schedule function unit 11 obtains each data amount (MS#1A-MS#nA) of transmission data 130 in transmission buffer 13 destined to a radio terminal (mobile terminal) MS being set to belong to the set reuse 1 zone (step S1 in FIG. 8).

Next, frame scheduler 112 obtains a modulation and coding scheme (MCS) relative to the radio terminal MS belonging to the reuse 1 zone (step S2).

Here, MCS is obtained in the following manner.

Frame schedule function unit 11 includes a register 110. From a downlink propagation environment data extraction unit 10, downlink propagation environment (CINR) information of radio terminals MS (MS#1A-#nA), which belong to the reuse 1 zone, and radio terminals (MS#1B-#mB), which belong to the reuse 3 zone, is received in register 110.

Frame schedule function unit 11 includes an MCS table 111.

An enlarged explanation diagram of MCS table 111 is illustrated in FIG. 9. In FIG. 9, MCS and the number of transmission bits per slot are made to correspond for each CINR range.

For example, when CINR is in the range of 10-15 dB, it may be read that the 16-QAM modulation scheme is adopted as MCS, and that the number of transmission bits per slot is 192 bits.

Accordingly, by reference to MCS table 111, it is decided in which range the CINR being set in register 110 corresponding to the radio terminal MS, belonging to the reuse 1 zone at the time of prior frame transmission, is included, and the corresponding MCS is obtained accordingly.

Referring back to FIG. 8, in consideration of the MCS obtained in step S2, the data amount in transmission buffer 3 obtained earlier in step S1 is converted into the number of slots (symbols) necessary for transmission (step S3).

The above processing is performed for the entire radio terminals MS belonging to the reuse 1 zone (Yes in step S4).

Subsequently, processing similar to the aforementioned steps S1-S4 is performed in regard to the radio terminals MS belonging to the reuse 3 zone.

Namely, each data amount (MS#1B-MS#mB) in transmission buffer 13 of the radio terminals MS belonging to the reuse 3 zone is obtained (step S5). MCS belonging to the reuse 3 zone is obtained (step S6), which is then converted into the number of slots in consideration of the obtained MCS (step S7). The above processing is performed for the entire radio terminals MS in the reuse 3 zone (Yes in step S8).

Now, the conversion processing of step S3 and step S7 performed in a conversion unit 112A will be described by use of a typical example.

For example, it is assumed that users of five radio terminals MS1-MS5 belonging to the reuse 1 zone are existent, and that each occupied byte amount of the above radio terminals buffered in transmission buffer 13 is as follows.

The data amount in the transmission buffer of the radio terminal MS1 is 100 [bytes].

The data amount in the transmission buffer of the radio terminal MS2 is 50 [bytes].

The data amount in the transmission buffer of the radio terminal MS3 is 100 [bytes].

The data amount in the transmission buffer of the radio terminal MS4 is 200 [bytes].

The data amount in the transmission buffer of the radio terminal MS5 is 50 [bytes].

Further, it is assumed, from an initial propagation environment (CINR) value, that the radio terminals MS1, 2, 3 and 5 are distributed to the reuse 1 zone, and the radio terminal MS4 is distributed to the reuse 3 zone at the time of the prior frame transmission. Further, it is assumed that the propagation environment (CINR) becomes each the following value.

The propagation environment (CINR) of the radio terminal MS1 is 7 [dB].

The propagation environment (CINR) of the radio terminal MS2 is 13 [dB].

The propagation environment (CINR) of the radio terminal MS3 is 38 [dB].

The propagation environment (CINR) of the radio terminal MS4 is 26 [dB].

The propagation environment (CINR) of the radio terminal MS5 is 11 [dB].

Additionally, the fixed amount in the following calculation is assumed to be a case of FUSC (Full Usage of Subchannels) in WiMAX (Worldwide Interoperability for Microwave Access).

Because the propagation environment (CINR) of the radio terminal MS1 is 7 [dB], QPSK (¾) listed on the item 02 is adopted as MCS corresponding to the above propagation environment, as indicated in the enlarged chart of MCS table 111 illustrated in FIG. 9.

Here, the number of bits Z communicable in one slot is obtained by the following equation.

$$Z = A \times C \times S$$

where, A indicates a modulation rate, having 1 for BPSK, 2 for QPSK, 3 for 8PSK, 4 for 16QAM, and 6 for 64QAM, respectively.

C indicates a coding rate.

Further, S indicates the number of symbols per slot, having 96 symbols [=1 subchannel (=48 subcarriers×2 symbols)] in the case of FUSC in the downlink DL of WiMAX.

Therefore, by applying to the above equation Z=A×C×S, the number of bits Z transmittable in one slot is $$Z = 2 \text{ bits/symbol} \times \tfrac{3}{4} \times 96 \text{ symbols} = 144 \text{ bits.}$$

On the other hand, since the data amount in transmission buffer 1 of the radio terminal MS1 is 100 bytes, according to the calculation of the number of slots necessary for transmitting 100 bytes, the number of slots SL necessary for the transmission of 100 bytes is $$SL = 100 \text{ bytes} \times 8 \text{ bits/byte} \div 144 \text{ bits/slot} \approx 5.6 \text{ slots}$$

Thus, approximately 5.6 slots are to be allocated.

By the similar calculation, each number of slots necessary for each base station of the radio terminals MS2-MS5 becomes as follows, for the radio terminal MS2, 2.1 slots,
for the radio terminal MS3, 1.7 slots,
for the radio terminal MS4, 4.2 slots, and
for the radio terminal MS5, 2.1 slots.

The above obtained number of slots for the reuse 1 zone and the number of slots for the reuse 3 zone of each mobile station are input to a reuse 1 zone Σ calculation unit 112C and a reuse 3 zone Σ calculation unit 112D, respectively.

The distribution of the inputs to the above reuse 1 zone Σ calculation unit 112C and the reuse 3 zone Σ calculation unit 112D is made by a zone decision unit 112B, in synchronization with the readout of register 110.

In FIG. 7, the reuse 1 zone Σ calculation unit 112C calculates the sum (=ΣA) of the number of slots corresponding to the transmission data amount (data amount in the buffer) of the radio terminals MS #1A-# nA, belonging to the reuse 1 zone, being input after distributed by the output of zone decision unit 112B (step S9).

Similarly, the reuse 3 zone Σ calculation unit 112D calculates the sum (=ΣB) of the number of slots corresponding to the transmission data amount (data amount in the buffer) of the radio terminals MS#1B-#mB, belonging to the reuse 3 zone, being input after distributed by the output of zone decision unit 112B (step S10).

Next, a zone position decision unit 112E inputs the outputs of the reuse 1 zone calculation unit 112C and the reuse 3 zone calculation unit 112D. Then, from the ratio (=ΣA/ΣB) of the total number of slots (=ΣA) of the reuse 1 zone to the total number of slots (=ΣB) of the reuse 3 zone, zone position decision unit 112E obtains a boundary position between the reuse 1 zone and the reuse 3 zone so that the boundary position corresponds to a proportion ΣA/(ΣA+ΣB) of the total number of slots (=ΣA) of the reuse 1 zone (step S11).

The information of the boundary position thus obtained by zone position decision unit 112E of frame scheduler 112 is transferred to transmission buffer 13 and map generation unit 17 (step S12).

Additionally, a method for deciding the boundary position is not limited to the above method. It may also be possible to modify the setting from an external input.

Now, by use of a typical example, the boundary position obtained by the above zone position decision unit 112E is explained in the following.

The aforementioned five radio terminals MS1-MS5 are assumed. According to the calculation in the reuse 1 zone calculation unit 112C in regard to the total number of slots of the radio terminals MS1, MS2, MS3, MS5 distributed to the reuse 1 zone, the total number of slots of the reuse 1 zone is 5.6+2.1+1.7+2.1=11.5 slots.

Also, according to the calculation in the reuse 3 zone calculation unit 112D, because the base station belonging to the reuse 3 zone is only MS4, the total number of slots of the reuse 3 zone is 4.2 slots.

Next, the ratio thereof obtained in zone position decision unit 112E is (the total number of slots of the reuse 1 zone):(the
total number of slots of the reuse 3 zone)=11.5:
4.2≈8:3

Accordingly, the boundary position between the reuse 1 zone and the reuse 3 zone is set in a manner that the ratio thereof comes to be 8:3.

Corresponding thereto, downlink transmission data DL are distributed and stored into transmission buffer 13 with the ratio of 8 to 3, correspondingly to the reuse 1 zone and the reuse 3 zone.

Figure 3:
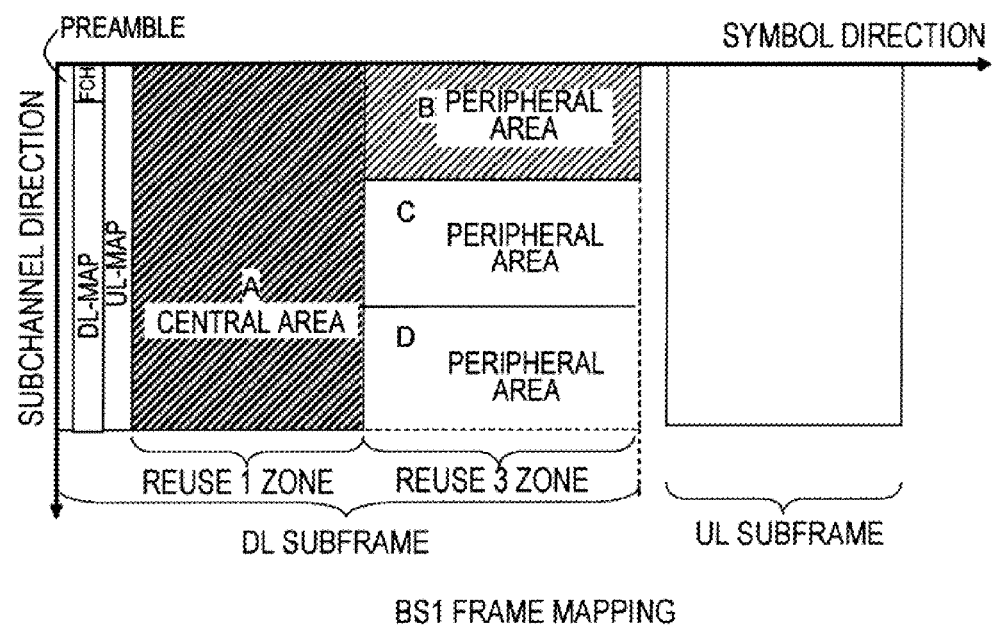
FIG. 3 illustrates an exemplary frame structure when FFR in the frequency axis direction is applied in the typical OFDMA (Orthogonal Frequency Division Multiple Access)
Figure 10:
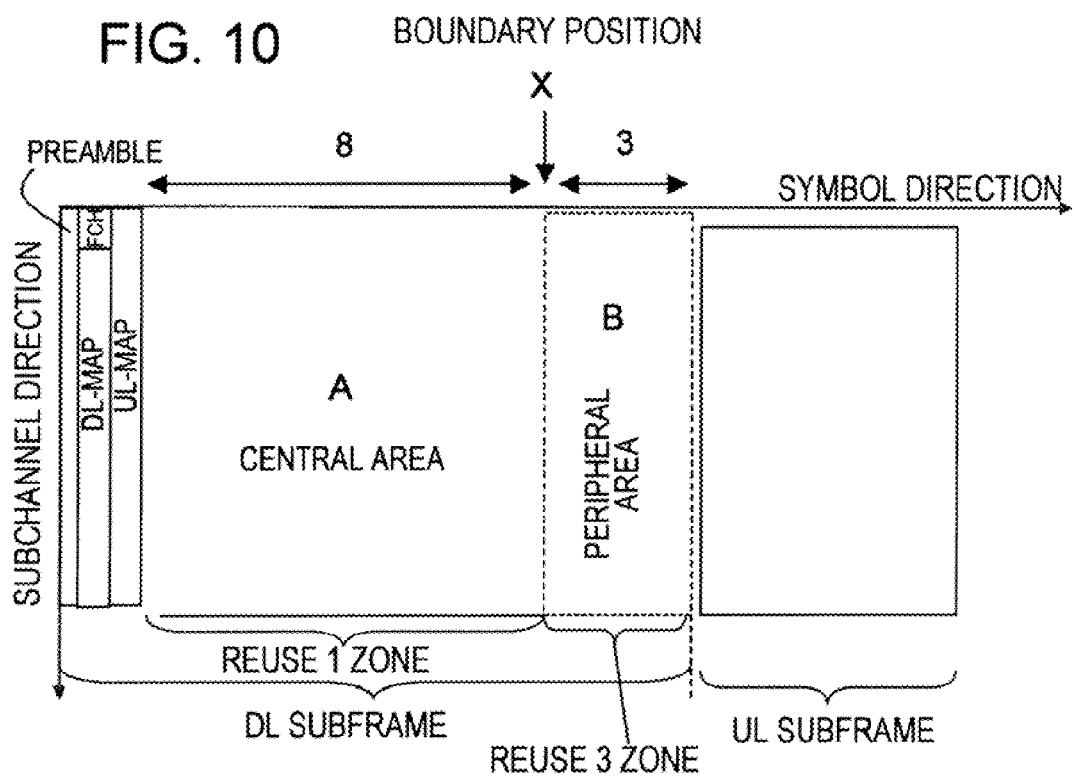
FIG. 10 illustrates a downlink subframe, which is illustrated by simplifying FIG. 3 or FIG. 5.

Now, according to the boundary position information from frame scheduler 112, map generation unit 17 sets a position X having the ratio of 8:3 in the symbol direction in the downlink subframe illustrated in FIG. 10, which is illustrated by simplifying FIG. 3 or FIG. 5, as the boundary position between the reuse 1 zone and the reuse 3 zone.

In the region of the reuse 1 zone of which boundary is set in the above manner, transmission data destined to the radio terminals belonging to the reuse 1 zone are allocated.

On the other hand, in the region of the reuse 3 zone, transmission data destined to the radio terminals belonging to the reuse 3 zone are allocated as illustrated in FIG. 3 or FIG. 5, depending on whether FFR in the frequency axis direction or FFR in the time axis direction is applied as an embodiment.

Figure 1:
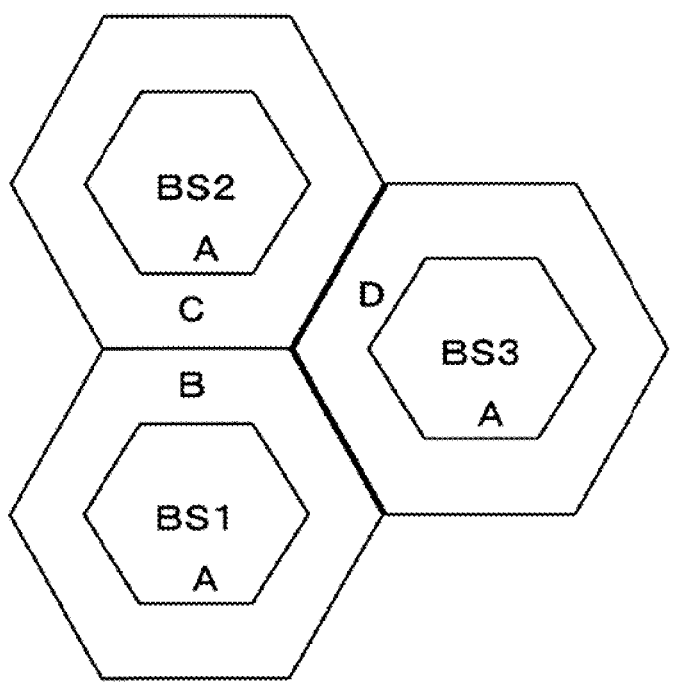
FIG. 1 is a diagram illustrating an exemplary cell allocation of three base stations BS1 to BS3.
Figure 2:
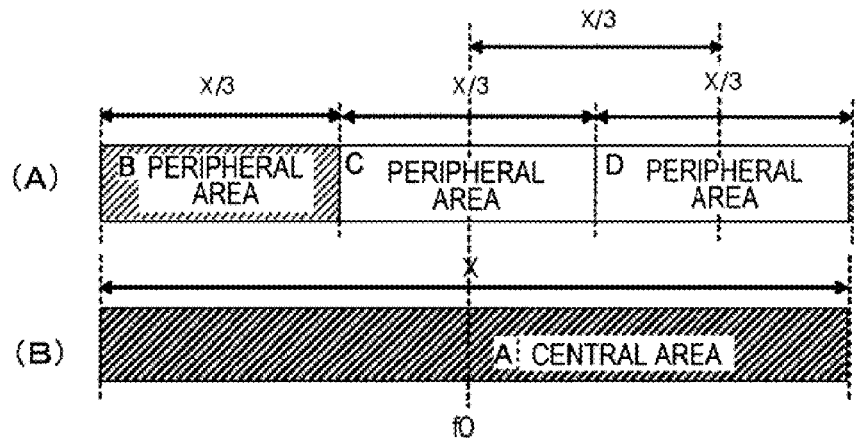
FIG. 2 illustrates exemplary frequency allocation when FFR in the frequency axis direction is applied.

Namely, when FFR in the frequency axis direction is applied, as illustrated in FIG. 2, a subchannel (in the frequency axis direction) is uniformly frequency divided by the number of radio terminals belonging to the reuse 3 zone of the downlink DL subframe, so as to be allocated to each radio terminal.

Figure 4:
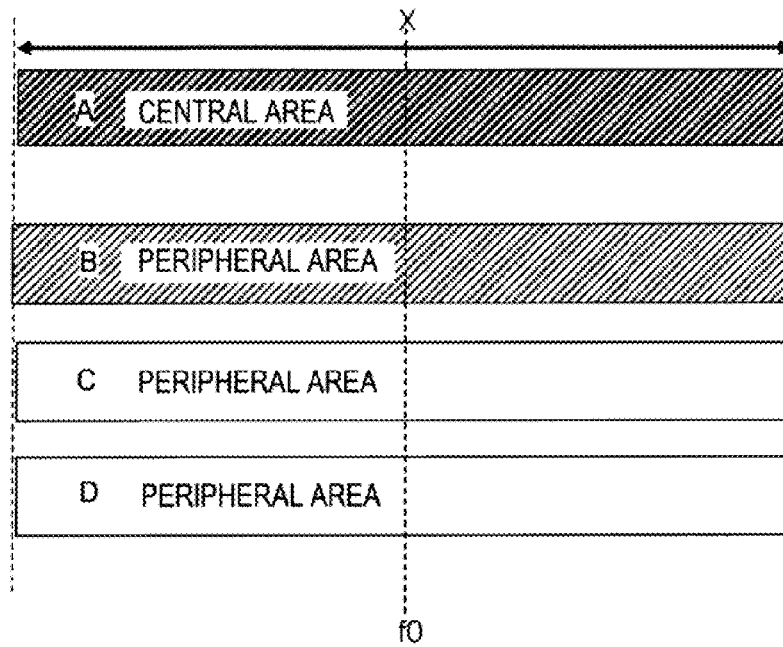
FIG. 4 illustrates exemplary frequency allocation when FFR the time axis direction is applied.

In contrast, when FFR in the time axis direction is applied, as illustrated in FIG. 4, the reuse 3 zone is uniformly time divided in the time axis direction (symbol direction) by the number of radio terminals belonging to the reuse 3 zone, so as to be allocated to each radio terminal.

Each radio terminal then performs radio communication with the base station using the allocated radio resources.

Figure 11:
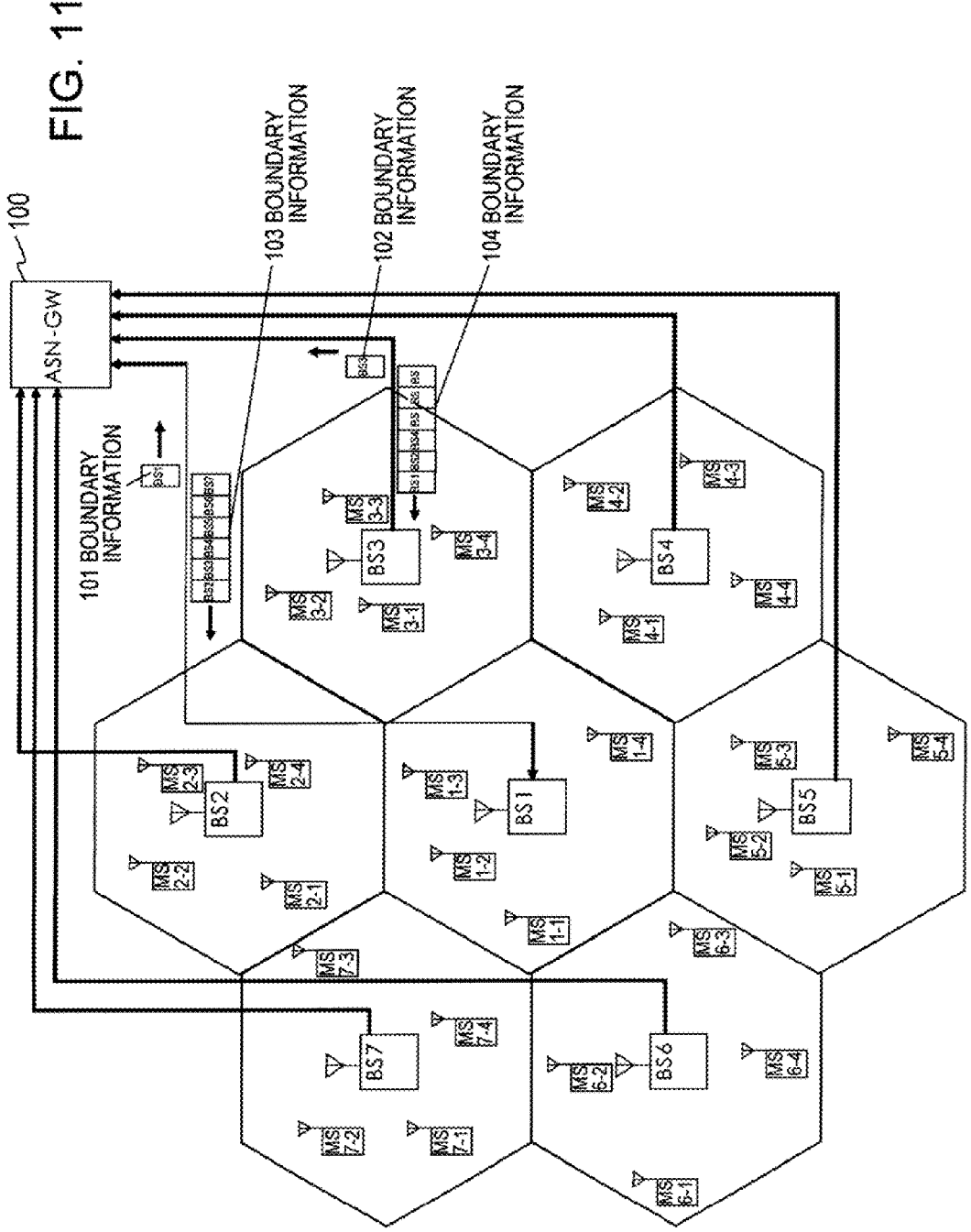
FIG. 11 is a system diagram illustrating another embodiment.

FIG. 11 is a system diagram illustrating another embodiment. In the present system, a gateway 100 is provided on the upper level of a plurality of base stations BS, and the boundary position information of the self base station and the boundary position information of other base stations are exchanged through gateway 100.

For the sake of simplification, FIG. 11 illustrates boundary position information 101, 102 of the self base station transmitted to gateway 100, and boundary position information 103, 104 of other base stations received from gateway 100, in regard to the base station BS1 and the base station BS3 only.

Figure 12:
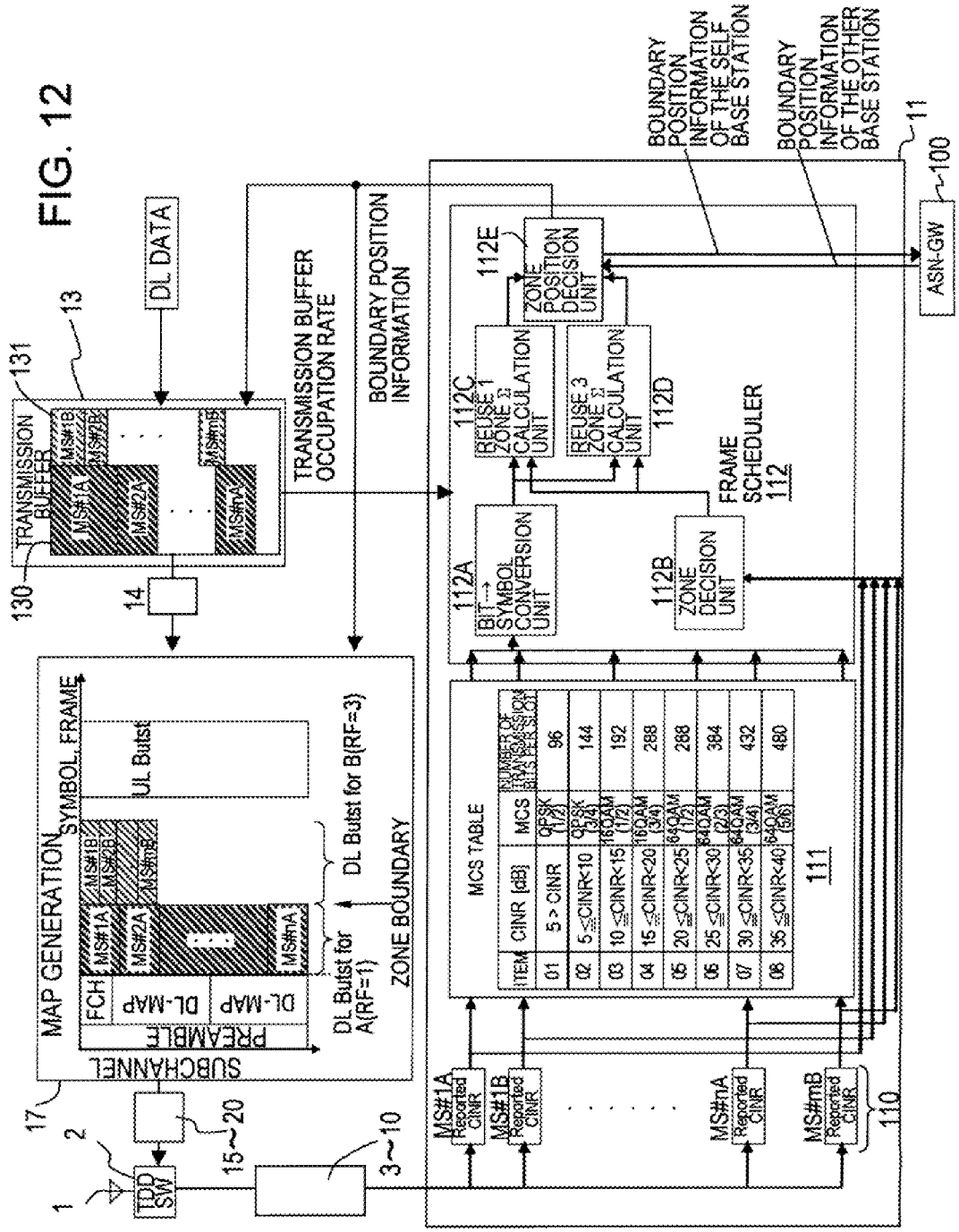
FIG. 12 is a diagram corresponding to the embodiment of the system illustrated in FIG. 11, illustrating a detailed configuration of a characteristic part of the embodiment, in which a frame schedule function unit illustrated in FIG. 6 is highlighted.

FIG. 12 is a diagram corresponding to the embodiment of the system illustrated in FIG. 11, illustrating a detailed configuration of a characteristic part of the embodiment, in which a frame schedule function unit 11 illustrated in FIG. 6 is highlighted.

A point of difference from the configuration illustrated in the corresponding FIG. 7 of the embodiment described earlier is that there is illustrated a configuration that zone position decision unit 112E of frame scheduler 112 transmits the boundary position information of the self base station to gateway 100, and also receives the boundary position information of other base stations from gateway 100.

Further, FIG. 13 illustrates an operating flow corresponding to the configuration illustrated in the above FIG. 12. In FIG. 13, the operations from step 1 to step 11 are identical to the operations described in the flow illustrated in FIG. 8, which explains the operations according to the preceding embodiment. The points of difference are as illustrated below.

Namely, each base station BS notifies gateway (ASN-GW) 100, being located in the upper level, of the zone boundary position information of the self base station BS (step S20). Also, each base station BS receives boundary position information from peripheral base stations BS through gateway 100 (step S21).

In FIG. 11, for simplification, information items transmitted and received to/from gateway (ASN-GW) 100 are illustrated in regard to the base stations BS1, BS3 only.

Namely, boundary information 101 of the base station BS1 is transmitted from the base station BS 1 to gateway (ASN-GW) 100, and boundary information 103 is transmitted from gateway (ASN-GW) 100 to the base station BS1.

Similarly, boundary information 102 of the base station BS3 is transmitted from the base station BS3 to gateway (ASN-GW) 100, and boundary information 104 is transmitted from gateway (ASN-GW) 100 to the base station BS3.

Zone position decision unit 112E in frame scheduler 112 of each base station obtains a mean value by adding the values of boundary position information for N cells transmitted from gateway 100, in regard to the self base station and other base stations belonging to the reuse 1 zone (step S22).

The above mean value is obtained from the following expression.

Mean value of the position information for $N$ cells in the reuse 1 zone=$(1/N) \times \Sigma((\Sigma A))$ Similarly, a mean value is obtained by adding the values of boundary position information for N cells of the self base station and the other base stations belonging to the reuse 3 zone (step S23).

The above mean value is obtained from the following expression.

Mean value of the position information for $N$ cells in the reuse 3 zone=$(1/N) \times \Sigma((\Sigma B))$ Next, zone position decision unit 112 obtains the ratio of the mean value of the position information for N cells of the reuse 1 zone to the mean value of the position information for N cells of the reuse 3 zone by the following expression, so as to decide the boundary position (step S24).

$\{(1/N) \times \Sigma((\Sigma A))\} / \{((1/N) \times \Sigma(\Sigma A))) + (1/N) \times \Sigma((\Sigma B)))\}$ Zone position decision unit 112E sends to map generation unit 17 the boundary position information decided on the basis of the above determined ratio.

Using the boundary position information sent from zone position decision unit 112E, map generation unit 17 allocates transmission data from transmission buffer 13 to the reuse 1 zone and the reuse 3 zone set to the downlink subframe, based on FFR in the frequency axis direction or FFR in the time axis direction, in a similar manner to the method described above in reference to FIG. 7.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention.

Although the embodiment(s) of the present inventions have been described in detail, it should be understood that the various changes, substitutions, and alterations could be made hereto without departing from the spirit and scope of the invention.

What is claimed is:

1. A radio communication apparatus in a radio communication system, which performs radio communication with a plurality of radio terminals, the radio communication apparatus comprising:
    a radio communication unit configured to perform radio communication with radio terminals of a first radio terminal group located near the center of a radio cell formed by one radio base station in a first time period by using a frequency commonly for use by adjacent base stations, which are adjacent to the one base station, and with radio terminals of a second radio terminal group located outside of an area where the first radio terminal group is located within the cell formed by the one radio base station in a second time period following the first time period by using a frequency not commonly for use by the adjacent base stations; and
    a control unit configured to adjust time allocation of the first time period and the second time period.

2. The radio communication apparatus according to claim 1, further comprising:
    a buffering unit configured to buffer transmission data of the first radio terminal group and the second radio terminal group, wherein
    the control unit controls the time allocation based on the relationship between a first amount of transmission data and a second amount of transmission data, which are buffered in the buffering unit, respectively for the first radio terminal group and the second radio terminal group.

3. The radio communication apparatus according to claim 2,
    wherein the control unit varies the time allocation, based on the buffered amount of the transmission data.

4. A radio communication apparatus in a radio communication system, which performs radio communication with a plurality of radio terminals, the radio communication apparatus comprising:
    a radio communication unit configured to perform radio communication with radio terminals of a first radio terminal group located near the center of a radio cell formed by one radio base station in a first time period by using a frequency commonly for use by adjacent base stations, which are adjacent to the one base station, and with radio terminals of a second radio terminal group located outside of the first radio terminal group within the cell formed by the one radio base station in a second time period following the first time period by using a frequency not commonly for use by the adjacent base stations; and
    a control unit configured to adjust time allocation of the first time period and the second time period, wherein
    the control unit performs adaptive modulation control to switch a modulation scheme, and sets a radio terminal to belong to the first radio terminal group or to the second radio terminal group, according to radio quality with the radio terminal, and wherein
    when a transmission time caused by the application of a higher speed modulation scheme to the first radio terminal group as compared to the second radio terminal group is reduced, the control unit uses the reduction of the transmission time to decrease the time allocation to the first period.

5. A radio communication method in a radio communication system, for performing radio communication with a plurality of radio terminals, the radio communication method comprising:
performing radio communication with radio terminals of a first radio terminal group located near the center of a radio cell formed by one radio base station in a first time period by using a frequency commonly for use by adjacent base stations, which are adjacent to the one base station, and with radio terminals of a second radio terminal group located outside of an area where the first radio terminal group is located within the cell formed by the one radio base station in a second time period following the first time period by using a frequency not commonly for use by the adjacent base stations; and
adjusting time allocation of the first time period and the second time period.

6. A radio communication apparatus comprising:
a radio communication unit configured to perform radio communication with a first radio terminal group located near the center of a radio cell formed by one radio base station in a first period by a frequency commonly for use by at least one of a plurality of adjacent base stations, which are adjacent to the one base station, and in among a plurality of partial periods included in a second period, suspending transmission in each partial period of exclusive transmission performed by the at least one of the plurality of adjacent base stations, to perform radio communication with a second radio terminal group located outside of an area where the first radio terminal group is located within the cell formed by the one radio base station in a second partial period of transmission suspension by the adjacent base stations, being included in the second period and different from the each partial period of exclusive transmission;
a control unit configured to adjust time allocation of the first period and the second period, and to apply a partial period in the adjusted second period as the second partial period; and
a radio communication unit configured to perform radio communication with the first radio terminal group and the second radio terminal group according to the time allocation adjusted by the control unit.

7. A radio communication apparatus using frames allocated by dividing a region specified in a frequency axis direction and a symbol direction into a first region, having a frequency commonly for use by an adjacent base station allocated to a first radio terminal group, and a second region, having a frequency not commonly for use by the adjacent base station allocated to a second radio terminal group, on the basis of each transmission frame, the radio communication equipment comprising:
a transmission buffer retaining transmission data of respective radio terminals in the first and the second radio terminal groups; and
a frame scheduler unit setting a boundary position to allocate the first region and the second region, wherein
the frame scheduler unit obtains a transmission data amount stored in the transmission buffer and destined to each radio terminal in the first radio terminal group belonging to the first region and downlink propagation environment information at the time of preceding frame transmission, and based on a modulation and coding scheme being preset corresponding to the downlink propagation environment information, obtains a first accumulation value of the number of slots required for the transmission data amount in regard to the first radio terminal group, and
obtains a transmission data amount stored in the transmission buffer and destined to each radio terminal in the second radio terminal group belonging to the second region and downlink propagation environment information, and based on a modulation and coding scheme being preset corresponding to the downlink propagation environment information, obtains a second accumulation value of the number of slots required for the transmission data amount in regard to the second radio terminal group, and
corresponding to the proportion of the first accumulation value to the second accumulation value, determines the boundary position to allocate the first region and the second region for a new transmission frame.

8. The radio communication apparatus according to claim 7,
wherein, respectively corresponding to the first accumulation value and the second accumulation value, the frame scheduler unit obtains mean values between with the first accumulation value and the second accumulation value of the other base station, and
corresponding to the proportion of the obtained mean value of the first accumulation value to the mean value of the second accumulation value, determines the boundary position to allocate the first region and the second region for a new transmission frame.

9. The radio communication apparatus according to claim 7,
wherein, in the symbol direction, the second region is uniformly allocated to a plurality of radio terminals in the second radio terminal group.

10. The radio communication apparatus according to claim 7,
wherein, in the frequency axis direction, the second region is uniformly allocated to a plurality of radio terminals in the second radio terminal group.

11. A frequency band reallocation method for allocating a region specified in a frequency axis direction and a symbol direction by dividing into a first region, having a frequency commonly for use by an adjacent base station allocated to a first radio terminal group, and a second region, having a frequency not commonly for use by the adjacent base station allocated to a second radio terminal group, on the basis of each transmission frame, the frequency band reallocation method comprising:
obtaining a transmission data amount to each radio terminal in the first radio terminal group belonging to the first region and downlink propagation environment information at the time of preceding frame transmission;
based on a modulation and coding scheme being preset corresponding to the downlink propagation environment information, obtaining a first accumulation value of the number of slots required for the transmission data amount in regard to the first radio terminal group;
obtaining a transmission data amount to each radio terminal in the second radio terminal group belonging to the second region and downlink propagation environment information;
based on a modulation and coding scheme being preset corresponding to the downlink propagation environment information, obtaining a second accumulation value of the number of slots required for the transmission data amount in regard to the second radio terminal group; and corresponding to the proportion of the first accumulation value to the second accumulation value, determining the boundary position to allocate the first region and the second region for a new transmission frame.

12. The frequency reallocation according to claim 11, further comprising:

respectively corresponding to the first accumulation value and the second accumulation value, obtaining mean values between with the first accumulation value and the second accumulation value of the other base station; and corresponding to the proportion of the obtained mean value of the first accumulation value to the mean value of the second accumulation value, determining the boundary position to allocate the first region and the second region for a new transmission frame.

13. The frequency reallocation according to claim 11, further comprising the step of:

in the symbol direction, uniformly allocating the second region to the plurality of radio terminals in the second radio terminal group.

14. The frequency reallocation according to claim 11, further comprising the step of:

in the frequency axis direction, uniformly allocating the second region to the plurality of radio terminals in the second radio terminal group.

15. A radio communication system including a plurality of radio base stations, each having a radio cell area, and communicating with a radio terminal in the radio cell area, wherein each of the plurality of radio base stations uses frames allocated by dividing a region specified in a frequency axis direction and a symbol direction into a first region, having a frequency commonly for use by an adjacent base station allocated to a first radio terminal group, and a second region, having a frequency not commonly for use by the adjacent base station allocated to a second radio terminal group, on the basis of each transmission frame, and the each radio base station includes:

a transmission buffer retaining transmission data of the respective radio terminals in the first and the second radio terminal groups; and a frame scheduler unit setting a boundary position to allocate the first region and the second region, wherein the frame scheduler unit obtains a transmission data amount in the transmission buffer to each radio terminal in the first radio terminal group belonging to the first region and downlink propagation environment information at the time of preceding frame transmission, and based on a modulation and coding scheme being preset corresponding to the downlink propagation environment information, obtains a first accumulation value of the number of slots required for the transmission data amount in regard to the first radio terminal group, and obtains a transmission data amount in the transmission buffer to each radio terminal in the second radio terminal group belonging to the second region and downlink propagation environment information, and based on a modulation and coding scheme being preset corresponding to the downlink propagation environment information, obtains a second accumulation value of the number of slots required for the transmission data amount in regard to the second radio terminal group, and corresponding to the proportion of the first accumulation value to the second accumulation value, determines the boundary position to allocate the first region and the second region for a new transmission frame.

16. The radio communication system according to claim 15, wherein, respectively corresponding to the first accumulation value and the second accumulation value, the frame scheduler unit obtains mean values between with the first accumulation value and the second accumulation value of the other base station, and corresponding to the proportion of the obtained mean value of the first accumulation value to the mean value of the second accumulation value, determines the boundary position to allocate the first region and the second region for a new transmission frame.

17. The radio communication system according to claim 15, wherein, in the symbol direction, the second region is uniformly allocated to a plurality of radio terminals in the second radio terminal group.

18. The radio communication system according to claim 15, wherein, in the frequency axis direction, the second region is uniformly allocated to a plurality of radio terminals in the second radio terminal group.

* * * * *